United States Patent
Kumhyr et al.

(12)

(10) Patent No.: US 6,421,680 B1
(45) Date of Patent: *Jul. 16, 2002

(54) METHOD, SYSTEM AND COMPUTER PROGRAM PRODUCT FOR CASE AND CHARACTER-ENCODING INSENSITIVE SEARCHING OF INTERNATIONAL DATABASES

(75) Inventors: David Bruce Kumhyr, Fuguay-Varina; John Ferguson Linton, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/211,811

(22) Filed: Dec. 15, 1998

(51) Int. Cl.$^7$ .............................. G06F 17/30; G06F 9/00
(52) U.S. Cl. .......................... 707/103; 707/10; 709/303
(58) Field of Search ............................... 707/103, 4, 9; 709/303, 226; 345/703

(56) References Cited

U.S. PATENT DOCUMENTS

| 5,416,903 A | * | 5/1995 | Malcolm ..................... 345/703 |
| 5,812,964 A | | 9/1998 | Finger ............................. 704/7 |
| 6,049,838 A | * | 4/2000 | Miller et al. ................. 709/303 |
| 6,233,586 B1 | * | 5/2001 | Chang et al. ................ 707/103 |

* cited by examiner

*Primary Examiner*—Safet Metjahic
*Assistant Examiner*—Te Yu Chen
(74) *Attorney, Agent, or Firm*—Marilyn S. Dawkins; Bracewell & Patterson, L.L.P.

(57) ABSTRACT

A search string for searching data distributed among various hosts employing different character encoding schemes or having different case-mapping capabilities is entered in a multi-field text string class. The multi-field text string class includes methods for transliterating characters within the original search string based on defined character equivalence tables. When the search string is received at a data host, a comparison is made of the operating system run on the originating data processing system, identified in a source-Variant field of the multi-field text string class, and the operating system run on the data host, identified in a targetVariant field of the multi-field text string class. If necessary, an appropriate character equivalence table is selected and a variant of the search string is generated by transliteration. The search string variant is then passed to a search engine to search local data, either with or without the original search string, and matches identified are returned as matches for the original search string. Accurate search results are therefore produced despite the presence of different character encoding schemes, such as EBCDIC versus ASCII/Unicode, or operating systems which do not support case mapping.

25 Claims, 3 Drawing Sheets

METHOD, SYSTEM AND COMPUTER PROGRAM PRODUCT FOR CASE AND CHARACTER-ENCODING INSENSITIVE SEARCHING OF INTERNATIONAL DATABASES

RELATED APPLICATIONS

The present invention is related to the subject matter of the following commonly assigned, copending United States patent applications: Ser. No. 09/211,810 entitled "METHOD, SYSTEM, AND COMPUTER PROGRAM PRODUCT FOR PROVIDING A USER INTERFACE WITH ALTERNATIVE DISPLAY LANGUAGE CHOICES" and filed Dec. 15, 1998; Ser. No. 09/211,809 entitled "METHOD, SYSTEM AND COMPUTER PROGRAM PRODUCT FOR CAPTURING LANGUAGE TRANSLATION AND SORTING INFORMATION INTO A TEXT STRING CLASS" and filed Dec. 15, 1998; Ser. No. 09/211,808 entitled "METHOD, SYSTEM AND COMPUTER PROGRAM PRODUCT FOR SORTING TEXT STRINGS" and filed Dec. 15, 1998; Ser. No. 09/211,803 entitled "METHOD, SYSTEM AND COMPUTER PROGRAM PRODUCT FOR STORING TRANSLITERATION AND/OR PHONETIC SPELLING INFORMATION IN A TEXT STRING CLASS" and filed Dec. 15, 1998; Ser. No. 09/211,799 entitled "METHOD, SYSTEM AND COMPUTER PROGRAM PRODUCT FOR ROTATING THROUGH A SEQUENCE OF DISPLAY STATES IN A MULTI-FIELD TEXT CLASS IN A GRAPHICAL USER INTERFACE" and filed Dec. 15, 1998; Ser. No. 09/211,802 entitled "METHOD, SYSTEM AND COMPUTER PROGRAM PRODUCT FOR CONTROLLING THE GRAPHICAL DISPLAY OF MULTI-FIELD TEXT STRING OBJECTS" and filed Dec. 25, 1998; Ser. No. 09/211,813 entitled "METHOD, SYSTEM AND COMPUTER PROGRAM PRODUCT FOR DISPLAYING THE CONTENTS OF ALL FIELDS IN A MULTI-FIELD TEXT STRING OBJECT" and filed Dec. 15, 1998; Ser. No. 09/211,801 entitled "METHOD, SYSTEM AND COMPUTER PROGRAM PRODUCT FOR DYNAMIC LANGUAGE SWITCHING IN A MULTI-FIELD TEXT STRING OBJECT VIA MESSAGING" and filed Dec. 15, 1998; and Ser. No. 09/211,812 entitled "METHOD, SYSTEM AND COMPUTER PROGRAM PRODUCT FOR AUTOMATIC CHARACTER TRANSLITERATION IN A TEXT STRING OBJECT" and filed Dec. 15, 1998. The content of the above-referenced applications is incorporated herein by reference.

BACKGROUND OF THE INVENTION

1. Technical Field

The present invention relates in general to distributed database searches and in particular to reliably searching a heterogeneous distributed data base in which a diverse set of character mappings are employed. Still more particularly, the present invention relates to a data structure and case and character set insensitive search method and apparatus for reliably searching a distributed database which spans multiple system character encoding schemes for underlying data.

2. Description of the Related Art

Databases are employed by enterprises as key repositories of information. To a large extent, the value of the data stored within a database is determined by the reliability of accessing the stored information upon demand. In large databases with many persons entering the data, the integrity of the data may become compromised by differences in data entry techniques. Entries may be made, for instance, in various combinations of casings.

In distributed databases, particularly those which range across a variety of operating systems utilizing different character encoding schemes such the American National Standard Code for Information Interchange (ASCII) or Unicode on Windows NT or PC and Unix servers/workstations versus the Extended Binary-Coded Decimal Interchange Code (EBCDIC) on IBM mainframes, data entry and character encoding variances pose a problem for matching search keys. Traditional matching methods for searching are based on exact matches, such that possible matches are missed, particularly for operating systems or character sets which do not support case mapping or where a discrepancy in character encoding exists.

For instance, an operator searching for records within a database while on the telephone with a customer may enter "david kumhyr" in the name field(s) of the database search engine's user interface. The search application may search the database on a remote Unix-based system and find no match to the original name data if the data was originally entered as "David Kumhyr". A similar result may occur even if there is no variance in the entered text between entries due to data not matching because the character encoding schemes differ. The hex encoded value for the first character ("D") in the search key "David Kumhyr" is C4 in EBCDIC and 44 in ASCII (0044 in Unicode).

Fuzzy search algorithms applied to the problem described above tend to generate large quantities of non-matching data which must be further qualified to determine a match. A case and character set insensitive search method is therefore required. Often there is a need to create a search string which is a case insensitive equivalent to the base text. However, casing is a locale and language dependent operation, which is further dependent on the character encoding scheme employed, such as EBCDIC.

It would be desirable, therefore, to provide a case and character set insensitive search method and apparatus. It would further be advantageous if the search method could be transparently employed across systems utilizing incongruent character set encodings.

SUMMARY OF THE INVENTION

It is therefore one object of the present invention to provide an improved method, system and computer program product for distributed database searches.

It is another object of the present invention to provide an improved method, system and computer program product for reliably searching a heterogeneous distributed data base in which a diverse set of character mappings are employed.

It is yet another object of the present invention to provide a method, system and computer program product for is reliably case and character set insensitive searching of distributed databases which span multiple system character encodings for underlying data.

The foregoing objects are achieved as is now described. A search string for searching data distributed among various hosts employing different character encoding schemes or having different case-mapping capabilities is entered in a multi-field text string class. The multi-field text string class includes methods for transliterating characters within the original search string based on defined character equivalence tables. When the search string is received at a data host, a comparison is made of the operating system run on the originating data processing system, identified in a source- Variant field of the multi-field text string class, and the operating system run on the data host, identified in a targetVariant field of the multi-field text string class. If necessary, an appropriate character equivalence table is selected and a variant of the search string is generated by transliteration. The search string variant is then passed to a search engine to search local data, either with or without the original search string, and matches identified are returned as matches for the original search string. Accurate search results are therefore produced despite the presence of different character encoding schemes, such as EBCDIC versus ASCII/Unicode, or operating systems which do not support case mapping.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
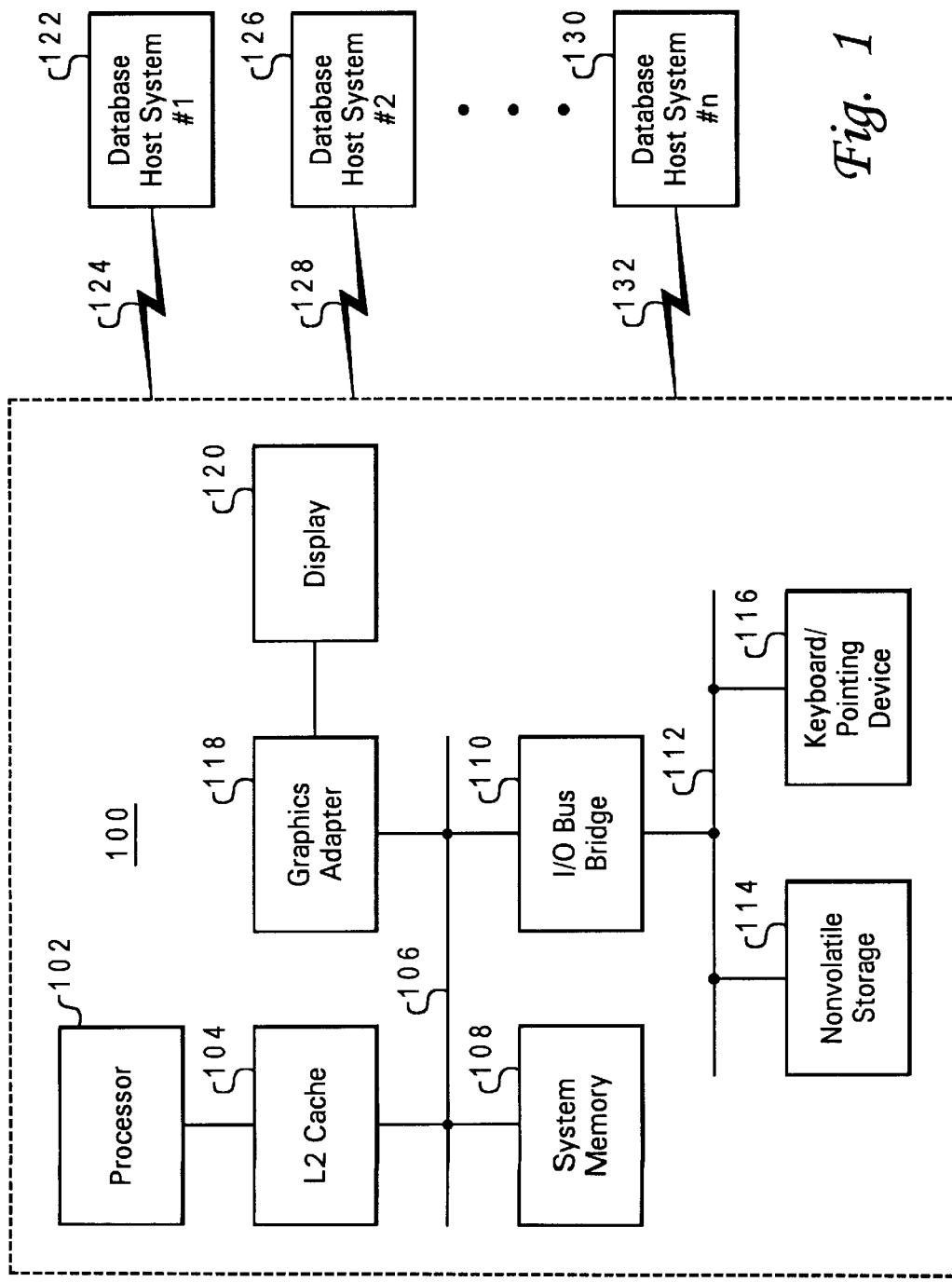
FIG. 1 depicts a block diagram of a data processing system network in which a preferred embodiment of the present invention may be implemented.

With reference now to the figures, and in particular with reference to FIG. 1, a block diagram of a data processing system network in which a preferred embodiment of the present invention may be implemented is depicted. The data processing system network depicted includes a data processing system 100, which may be, for example, one of the Aptiva® models of personal computers available from International Business Machines Corporation of Armonk, N.Y. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention.

Data processing system 100 is coupled to database host system 122 via communications link 124, to database host system 126 via communications link 128, and to database host system 130 via communications link 132. Database host systems 122, 126, and 130 may collectively host a distributed database in accordance with the known art, or another collection of information to be searched utilizing one or more keywords from data processing system 100, and, may comprise different types of systems employing differing character encoding schemes as previously described. The character encoding scheme employed in database host systems 122, 126, and 130 may differ among those systems as well as from thecharacter encoding scheme employed on data processing system 100, from which the search is originated in the exemplary embodiment.

The data processing system network which is depicted and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2:
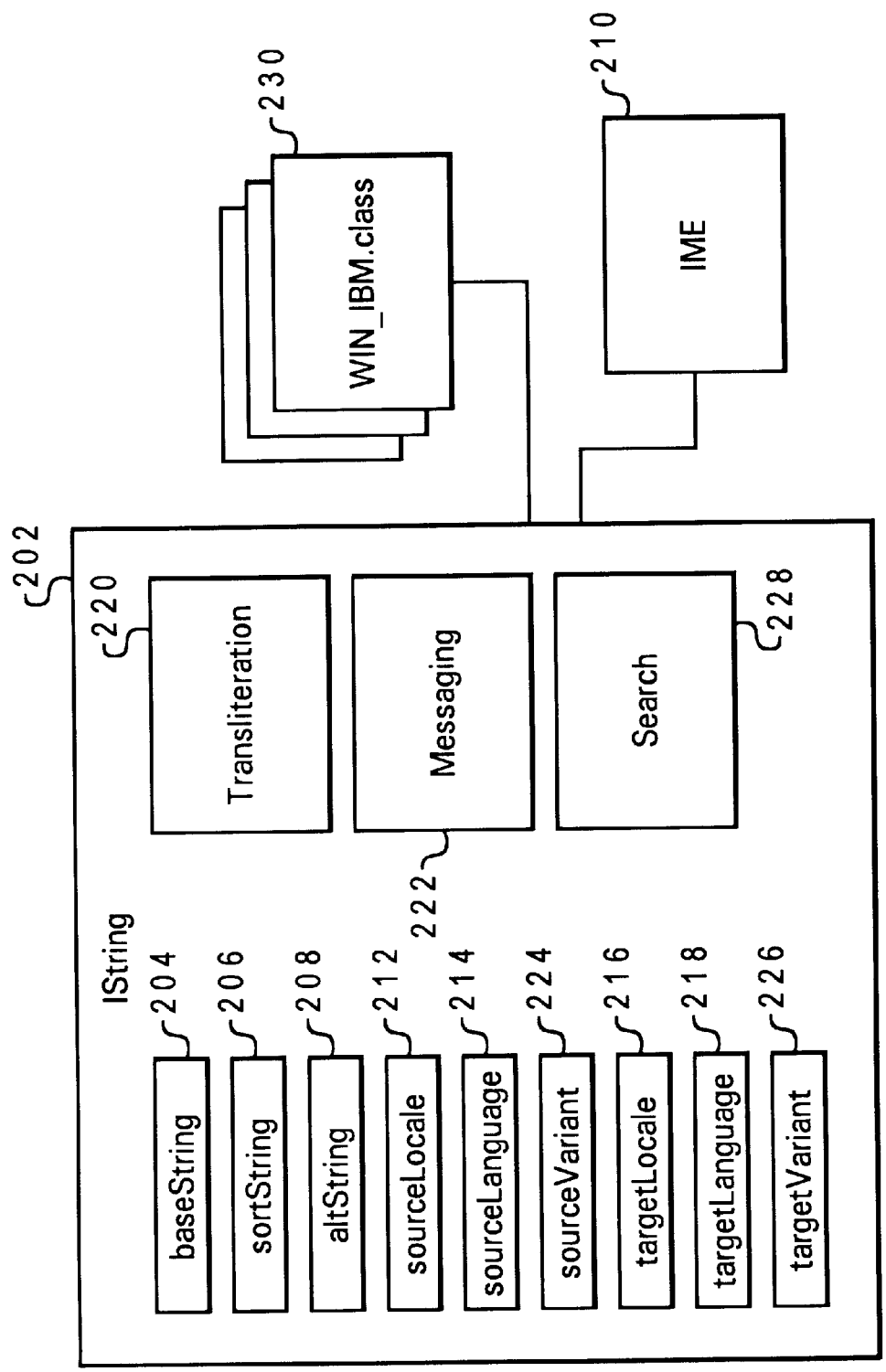
FIG. 2 is a diagram of a multi-field text string class in accordance with a preferred embodiment of the present invention.

Referring to FIG. 2, a diagram of a multi-field text string class in accordance with a preferred embodiment of the present invention is depicted. International String Control ("IString") class 202 may be utilized to support searching across multiple systems having different character encoding schemes. IString class 202 is preferably a Java class similar to the Java String class, and which behaves like the String class by including similar methods. Most of the original behavior of the String class should be preserved, with additional functionality added and utilized only as needed. IString class 202 is a data type utilized for all database search keywords.

The IString class 202 structure includes three different strings for each name, data, or text object: a baseString 204, a sortString 206, and an altString 208. BaseString 204 is the string employed by default in the user interface display, and may contain any text, usually the original text entered in the local language where the IString is instantiated. SortString 206 may also be any text and is employed to allow correct sorting of non-phonetic languages and languages which are difficult to sort based only on the binary value of baseString 204. AltString 210 may be any text but should conventionally be filled with a latin character set representation of the pronunciation (phonetic spelling) of the data contained in basestring 204. Thus, IString class 202 includes the original text (basestring 204), a sort key (sortString 206), and a pronunciation key (altString 208) for object names and data.

When implemented in Java, a constructor for an IString class 202 object may be composed of the following fields:

/** The base text String */
protected String baseString;
/** The related text String for proper collation */
protected String sortString;
/** The related alternate text String (pronunciation key) */
protected String altString;
/** The source locale, as an ISO-3166 code; used for collation */
protected String sourceLocale;
/** The source language, as an ISO-639 code */ protected String sourceLanguage;
/** The source variant defined for EBCIDIC and case
    mapping */
protected String sourceVariant;
/** The target locale, as an ISO-3166 code */
protected String targetLocale;
/** The target language, as an ISO-639 code */
protected String targetLanguage;
/** The target variant defined for EBCIDIC and case
    mapping */
protected String targetVariant;

The contents of baseString 204, sortString 206, and altString 208 may depend at least in part on language and locale parameters defined by sourceLocale field 212, sourceLanguage field 214, targetLocale field 216, and targetLanguage 218. Character strings may be entered into the baseString 204, sortString 206, and altString 208 fields by either the Input Method Editor (IME) engine 210 or the transliteration engine 220.

A constructor for an IString class object 202 may be:

```
/****************************************************
*
* <P></P>
*
* <dt><b>Description:</b><dd>
* <p> Allocate a new IString containing no characters in the default
* locale.</p>
*
****************************************************/
public IString() {
    this.baseString = new String();
    this.sortString = new String();
    this.altString = new String();
}
```

Table I illustrates how data within the IString data type 202 looks when represented as a table:

TABLE I

| Field | Type | Data |
|---|---|---|
| baseString | Java String | The user's text |
| sortString | Java String | Transliterated by IString |
| altString | Java String | Transliterated by IString |
| sourceLocale | Java String | ISO-3166 code, example "US" |
| sourceLanguage | Java String | ISO-639 code, example "en" |
| sourceVariant | Java String | Variant code |
| targetLocale | Java String | ISO-3166 code, example "JP" |
| targetLanguage | Java String | ISO-639 code, example "ja" |
| targetVariant | Java String | Variant code |

To allow objects of the IString class 202 data type to be stored in an Object Database. (ODB), and to permit manipulation of IString data by legacy framework applications, an Interface Definition Language (IDL) class should be defined:

```
struct IString{
string baseString;      //base test String
string sortString;      //related text String for collation
string altString;       //related alternate text String (pronunciation)
string sourceLocale;    //source locale as an ISO-3166 code
string sourceLanguage;  //source language as an ISO-639 code
string sourceVariant;   //source variant code
```

-continued

```
string targetLocale;    //target locale as an ISO-3166 code
string targetLanguage;  //target language as an ISO-639 code
string targetVariant;   //target variant code
}
```

Complete listings of the upper-case, two letter ISO Country Codes defined by ISO-3166 and the lower-case, two letter ISO Language Codes defined by ISO-639 are readily available from a variety of sources on the Internet.

Input of data to an IString class 202 object is preferably locale- or language-dependent. A constructor for allocating a new, empty IString for a specified locale may be:

```
/****************************************************
*
* <P></P>
*
* <dt><b>Description:</b><dd>
* <p> Allocate a new IString containing no characters in the
* specified locale.</p>
*
****************************************************/
public IString(Locale loc) {
    this.baseString = new String();
    this.sortString = new String();
    this.altString = new String();
    this.sourceLocale = loc.getLocale();
    this.sourceLanguage = loc.getLanguage();
    this.sourceVariant = loc.getVariant();
}
```

The input of data into fields baseString 204, sortString 206 and altString 208 with IME 210 or transliteration engine 220, and the display and manipulation of the contents of baseString 204, sortString 206 and altString 208 without or without messaging methods 222, as well as the operation of IString 202 with respect to those fields for different values of sourceLocale field 212, sourceLanguage field 214, targetLocale field 216, and targetLanguage 218, are described in greater detail in the related applications. For the sake of clarity, those subjects will not be again described herein.

In the present invention, IString class 202 includes sourceVariant and targetVariant fields 224 and 226. The variant codes contained within sourceVariant and targetVariant fields 224 and 226 are operating system vendor specific and identify the character encoding scheme employed by the operating system. For example, "WIN" may be utilized for Windows operating systems, "MAC" for Apple products, "IBM" for IBM mainframes utilizing EBCDIC, "POSIX" for systems utilizing the POSIX operating system, etc. Various codes may be developed and employed, but should be standardized across all systems employing IString class 202 to search across multiple systems.

Search methods 228 within IString class 202 provide operating system-dependent character-mapping and casing algorithms to format information entered into baseString 204 as a search key into an operating system-dependent search string. These algorithms perform characterwise transliterations on the search key utilizing an appropriately selected Java resource file 230. The resulting variant of the original search key may then be stored in baseString 204 as the new search key or employed independently of the contents of baseString 204 for searching.

To search across multiple systems having diverse character encoding systems in the present invention, the variant code for the operating system/character encoding scheme under which the search key was formed is placed within the sourceVariant field 224. An operating system property (not shown) specifying "WIN" or "IBM" may be relied upon to specify the correct operating system and character encoding scheme. The search key is then transmitted to each system containing data to be search in the baseString field 204 of an IString object 202.

As each system receives a copy of the search key for the search, a comparison is made by search methods 228 within IString class 202 of the code within the sourceVariant field 224 and the code for the operating system running on the host system, which is entered into targetVariant field 226. If a difference exists, search methods utilize Java resource files 230 to create a character-mapped variant of the search key suitable for the underlying host operating system. Java resource files 230 are named for the combination of operating systems for which the mapping is being performed. In the example shown in FIG. 2, WIN_IBM.class is for mapping Windows ASCII or Unicode characters to EBCDIC characters.

Java resource files 230 contain tables of character equivalents for different operating systems and character encoding schemes. These tables are employed by search methods 228 to generate a search variant based on the contents of sourceVariant and targetVariant fields 224 and 226. Thus, for the example described earlier in which the search key was "David Kumhyr", the sourceVariant field 224 may contain the code "WIN" and the targetVariant field 226 may contain the code "IBM". The search key received from a PC system operating Windows would be encoded in ASCII as the hex values:

| D | a | v | i | d | | K | u | m | h | y | r |
|---|---|---|---|---|---|---|---|---|---|---|---|
| 44 | 61 | 76 | 69 | 64 | 20 | 4B | 75 | 6D | 68 | 79 | 72 |

Upon being received at an IBM mainframe utilizing EBCDIC character encoding, a search variant of the search key would be automatically created by transliterating the characters is from ASCII encoded hex to EBCDIC encoded hex values:

| D | a | v | i | d | | K | u | m | h | y | r |
|---|---|---|---|---|---|---|---|---|---|---|---|
| C4 | 81 | A5 | 89 | 84 | 40 | D2 | A4 | 94 | 88 | A8 | 99 |

This search variant may then be entered into baseString 204 and employed to search data within the IBM mainframe receiving the search key, with any matches for the search variant being returned to the search originator as a match for the search key received.

Similar character transliteration utilizing character equivalence tables in Java resource files 230 may be performed for search keys in case-sensitive character environments, such as those found in Unix-based systems. Thus, the search key "David Kumhyr" may be transliterated to "david kumhyr" or, alternatively, "DAVID KUMHYR" for searching on a particular system. For casing situations (as opposed to character encoding transliterations), the variant(s) may be stored in sortString 206 and/or in altString 210 while the original search key is stored in baseString 204. In some cases, searching both or all three variants may be desirable to produce more accurate search results.

Although described above as being performed within a receiving system, the character transliteration of a multi-field text string search key may alternatively be performed within the originating system. A system from which a search is being initiated may thus format the search key to accommodate the character-encoding or case-sensitivity of data within the system to be searched prior to transmitting the search key.

Figure 3:
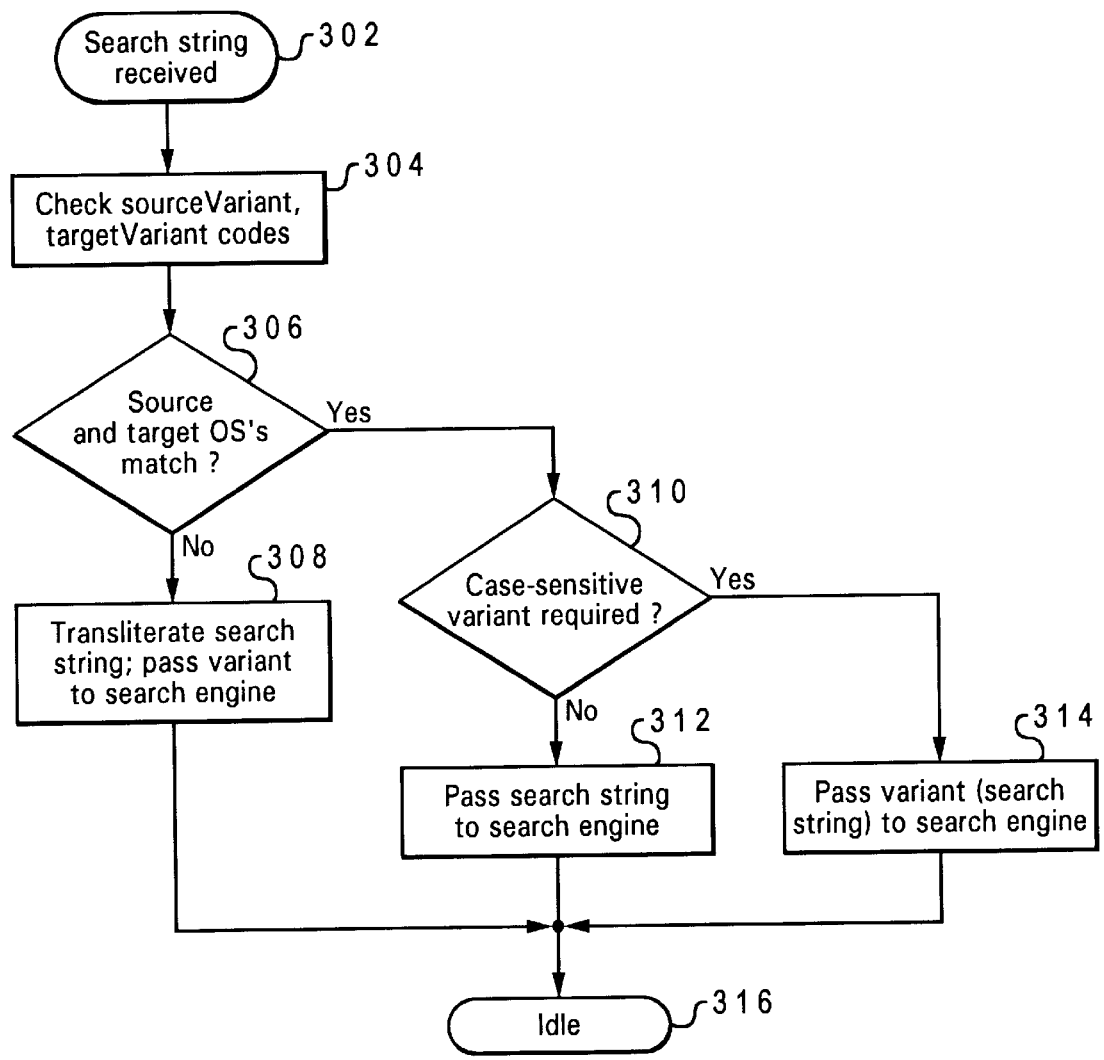
FIG. 3 depicts a high level flowchart for a process of employing a multi-field text string class for case and character encoding insensitive searching in accordance with a preferred embodiment of the present invention.

With reference now to FIG. 3, a high level flowchart for a process of employing a multi-field text string class for case and character encoding insensitive searching in accordance with a preferred embodiment of the present invention is depicted. The process begins at step 302, which depicts receiving a multi-field text class search string for searching a database. The process then passes to step 304, which illustrates checking the sourceVariant and targetVariant codes. The soutceVariant code is set by the system originating the multi-field text string search key, while the targetVariant code is set by the system receiving the search key for local searching.

The process next passes to step 306, which depicts a determination of whether the source and target operating system's match. If not, the process proceeds to step 308, which transliterating the characters in the search string utilizing the character equivalence map defined for the operating system pair (e.g., "WIN_IBM" or "PC_UNIX"). The transliterated search string variant is then passed to the search engine as a search key.

If the operating systems are determined to match in step 306, the process proceeds instead to step 310, which illustrates a determination of whether a case-mapped variant is required. As previously noted, some character sets do not support case mapping between uppercase and lowercase characters. For such operating systems, case mapped variants may be created for searching by transliterating characters. The process in such instances proceeds to step 314, which illustrates passing a transliterated variant to the search engine. The original search string may also be passed to the search engine to improve the accuracy of the search.

If a case-mapped search variant is not required for the operating system of the database host receiving the search string, the process proceeds instead from step 310 to step 312, which illustrates passing the originally received search string to the search engine. From any of steps 308, 312, or 314, the process next passes to step 316, which illustrates the process becoming idle until another search string is received.

Although described above as being employed for the search string of a search process, the IString class may also be utilized in data entry to create uniform casing in entered data. When a data item string is received for entry into a database, methods similar to the search methods 228 described above may be employed to transliterate characters as necessary to insure uniform casing of all data within the database. The originally entered data may, for instance, be stored in baseString 204 while the case-mapped variant (e.g., all uppercase or all lowercase characters) may be stored in sortString 206 or altString 208.

The present invention permits case and character-encoding insensitive searching of databases. Case and character code variants of a search string may be automatically generated by transliteration of characters utilizing defined character equivalence tables. Thus international databases, including those having data distributed among systems with different character encoding schemes and different case-mapping capabilities, may be uniformly and accurately searched without employing fuzzy search algorithms.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of searching heterogeneous data, comprising:
   receiving a search string within a multi-field text string class;
   comparing a variant code for an originating system to a variant code for a receiving system;
   responsive to determining a character-encoding or case-mapping difference between the originating system and the receiving system which requires transliteration of characters within the received search string, selecting a character equivalence table based on the originating system variant code and the receiving system variant code; and
   transliterating characters within the received search string utilizing the selected character equivalence table to generate a search string variant.

2. The method of claim 1, wherein the step of receiving a search string within a multi-field text string class further comprises:
   receiving a multi-field text string class object including a first field containing the search string, a second field containing the originating system variant code, and a third field into which the receiving system variant code is selectively entered.

3. The method of claim 1, wherein the step of receiving a search string within a multi-field text string class further comprises:
   receiving a Java object in the multi-field text string class.

4. The method of claim 1, wherein the step of comparing a variant code for an originating system to a variant code for a receiving system further comprises:
   comparing the originating system variant code to the receiving system variant code, wherein each variant code uniquely identifies an operating system.

5. The method of claim 1, wherein the step of selecting a character equivalence table based on the originating system variant code and the receiving system variant code further comprises:
   selecting a Java resource file containing the character equivalence table for transliterating characters from a character encoding scheme employed by a first operating system identified by the originating system variant code to a character encoding scheme employed by a second operating system identified by the receiving system variant code.

6. The method of claim 1, wherein the step of selecting a character equivalence table based on the originating system variant code and the receiving system variant code further comprises:
   selecting a Java resource file containing the character equivalence table for transliterating characters from a casing employed by a first operating system identified by the originating system variant code to a casing employed by a second operating system identified by the receiving system variant code.

7. The method of claim 1, wherein the step of transliterating characters within the received search string utilizing the selected character equivalence table to generate a search string variant further comprises:
   transliterating characters within the received search string from a first character encoding scheme to a second character encoding scheme.

8. The method of claim 1, wherein the step of transliterating characters within the received search string utilizing the selected character equivalence table to generate a search string variant further comprises:
   transliterating characters within the received search string from a first casing to a second casing.

9. The method of claim 1, further comprising:
   transmitting the search string variant to a search engine as a search key.

10. The method of claim 1, further comprising:
    transmitting the received search string and the search string variant to a search engine as search keys.

11. A system for searching heterogeneous data, comprising:
    a receiving system receiving a search string transmitted by an originating system within a multi-field text string class; and
    a transliteration engine within the receiving system, wherein the transliteration engine:
      compares a variant code for the originating system to a variant code for the receiving system;
      selects a character equivalence table based on the originating system variant code and the receiving system variant code in response to determining a character-encoding or case-mapping difference between the originating system and the receiving system which requires transliteration of characters within the received search string; and
      transliterates characters within the received search string utilizing the selected character equivalence table to generate a search string variant.

12. The system of claim 11, wherein receiving system receives a multi-field text string class object including a first field containing the search string, a second field containing the originating system variant code, and a third field into which the receiving system variant code is selectively entered.

13. The system of claim 11, wherein the receiving system receives a Java object in the multi-field text string class.

14. The system of claim 11, wherein the transliteration engine transliterates characters within the received search string from a first character encoding scheme to a second character encoding scheme.

15. The system of claim 11, wherein the transliteration engine transliterates characters within the received search string from a first casing to a second casing.

16. The system of claim 11, further comprising:
    a search engine within the receiving system, wherein the transliteration engine transmits the search string variant to the search engine as a search key.

17. The system of claim 11, further comprising:
    a search engine within the receiving system, wherein the transliteration engine transmits the received search string and the search string variant to a search engine as search keys.

18. A computer program product within a computer usable medium for searching heterogeneous data, comprising:

instructions for receiving a search string within a multi-field text string class;

instructions for comparing a variant code for an originating system to a variant code for a receiving system;

instructions, responsive to determining a character-encoding or case-mapping difference between the originating system and the receiving system which requires transliteration of characters within the received search string, for selecting a character equivalence table based on the originating system variant code and the receiving system variant code; and instructions for transliterating characters within the received search string utilizing the selected character equivalence table to generate a search string variant.

19. The computer program product of claim 18, wherein the instructions for comparing a variant code for an originating system to a variant code for a receiving system further comprise:

instructions for comparing the originating system variant code to the receiving system variant code, wherein each variant code uniquely identifies an operating system.

20. The computer program product of claim 18, wherein the instructions for transliterating characters within the received search string utilizing the selected character equivalence table to generate a search string variant further comprises:

instructions for transliterating characters within the received search string from a first character encoding scheme to a second character encoding scheme.

21. The computer program product of claim 18, wherein the instructions for transliterating characters within the received search string utilizing the selected character equivalence table to generate a search string variant further comprises:

instructions for transliterating characters within the received search string from a first casing to a second casing.

22. The computer program product of claim 18, further comprising:

instructions for transmitting the search string variant to a search engine as a search key.

23. The computer program product of claim 18, further comprising:

instructions for transmitting the received search string and the search string variant to a search engine as search keys.

24. A method of searching heterogeneous data, comprising:

storing a search string within a multi-field text string class;

storing a variant code for a host system within the multi-field text string class;

transmitting the multi-field text string class containing the search string to a database system; and receiving a match to the search string from the database system comprising characters transliterated from the search string utilizing a character equivalence table selected based on a comparison of the variant code for the host system and a variant code for the database system.

25. A system for searching heterogeneous data, comprising:

a host system including:

search logic storing a search string and a variant code for the host system within a multi-field text string class;

transmission logic transmitting the multi-field text string class containing the search string to a database system; and receiving a match to the search string from the database system comprising characters transliterated from the search string utilizing a character equivalence table selected based on a comparison of the variant code for the host system and a variant code for the database system.

* * * * *